United States Patent [19]

Tat et al.

[11] Patent Number: 5,825,757
[45] Date of Patent: Oct. 20, 1998

[54] METHODS AND APPARATUS FOR EXCLUDING COMMUNICATION CHANNELS IN A RADIO TELEPHONE

[75] Inventors: Nguyen Quan Tat; Robert Stanley Saunders, both of Surrey, England

[73] Assignee: Nokia Mobile Phones Limited, Salo, Finland

[21] Appl. No.: 584,109

[22] Filed: Jan. 11, 1996

[30] Foreign Application Priority Data

Jan. 10, 1995 [GB] United Kingdom .................. 9500799

[51] Int. Cl.[6] .................................................. H04B 7/212
[52] U.S. Cl. ......................... 370/330; 370/337; 370/332
[58] Field of Search .................................. 370/280, 337, 370/330, 331, 332, 329, 321, 341, 347, 442, 458; 455/33.1, 33.2, 34.1, 56.1, 54.1, 54.2, 67.1, 509, 514, 515, 422, 450, 452, 436–438

[56] References Cited

U.S. PATENT DOCUMENTS

| | | | |
|---|---|---|---|
| 5,134,709 | 7/1992 | Bi et al. | 455/33.1 |
| 5,134,710 | 7/1992 | Akerberg | 455/54.1 |
| 5,150,362 | 9/1992 | Akerberg | 370/331 |
| 5,175,758 | 12/1992 | Levanto et al. | 379/57 |
| 5,200,956 | 4/1993 | Pudney et al. | 370/337 |
| 5,210,752 | 5/1993 | Ito et al. . | |
| 5,210,771 | 5/1993 | Schaeffer et al. . | |
| 5,258,981 | 11/1993 | Davey et al. | 370/337 |
| 5,345,448 | 9/1994 | Keskitalo . | |
| 5,394,391 | 2/1995 | Chen et al. . | |
| 5,396,496 | 3/1995 | Ito et al. | 370/330 |
| 5,410,733 | 4/1995 | Niva et al. | 455/33.2 |
| 5,416,778 | 5/1995 | Chan et al. | 370/337 |
| 5,483,668 | 1/1996 | Malkamaki et al. | 455/33.2 |
| 5,598,407 | 1/1997 | Bud et al. | 370/330 |

FOREIGN PATENT DOCUMENTS 2249918  5/1992  United Kingdom .

Primary Examiner—Chau Nguyen
Attorney, Agent, or Firm—Perman & Green, LLP

[57] ABSTRACT

A portable radio telephone (5) communicates with base stations (1, 2) in a digital radio telephone system, such as DECT, employing TDMA transmission. The portable radio telephone is programmed with an algorithm which is operative to select a communication channel by storing a blind slot mask (7) representative of the time slots in each frame which are excluded, either by virtue of being occupied by the base station or by the portable radio telephone itself. Hence, any channel attempted and failed in an occupied time slot is excluded and marked blind in the blind slot mask. Further, the algorithm is operative to check the time slots for availability in a predetermined sequence which corresponds to the temporal sequence of the slots (or the reverse thereof) to promote orderly filling of the time slots at the base stations.

15 Claims, 6 Drawing Sheets

METHODS AND APPARATUS FOR EXCLUDING COMMUNICATION CHANNELS IN A RADIO TELEPHONE

CROSS-REFERNNCE TO A RELATED APPLICATION

This patent application is related to commonly assigned U.S. patent application Ser. No. 08/584,054, filed on even date herewith, entitled "Portable Radio Telephones and Methods of Operation", to N. Tat et al.

BACKGROUND OF THE INVENTION

This invention relates to portable radio telephones and in particular to such telephones for communication with base stations in a digital cellular radio telephone system employing transmission by a plurality of carrier frequencies in frames, such as TDMA frames, each consisting of a predetermined number of time slots. The invention also relates to a method of operation of such radio telephones, frequently called handsets. The invention is concerned with the allocation of a channel (that is a combination of a carrier frequency and time slot) to a portable radio telephone when a connection is first required ("call set-up") or when a change in channel is required ("handover") during a call to maintain call quality. Handover can either be to a different channel at the same base station (intracell) or to a different channel at a different base station (intercell).

Most of the currently manufactured DECT base station equipment only contains a single transceiver, and is therefore unable to open more than a single communication channel on different frequency carriers at the same instant. This restricts single transceiver base stations to only using a single time slot at any one time, effectively excluding the other carriers on this time slot and thereby turning them "blind". The DECT standards have foreseen this and include the blind slot information message to inform the handset of time slots it should avoid using. However, this information is not totally reliable, particularly on intercell handover when it is very difficult to obtain the blind slot information of any base station other than the one that the handset is connected to unless a separate 'observation' channel is opened. In addition to slots "blinded" by the base station, a handset will be unable to switch communication channels to a slot immediately adjacent to that which it is using.

This invention aims to provide a portable radio telephone, and a method of operation, employing a dynamic channel assignment algorithm that gives very robust performance, regardless of the availability and accuracy of the blind slot information. In addition to this, if an identical algorithm is deployed on every portable radio telephone in the system, further improvements in call blocking and call quality are likely.

SUMMARY OF THE INVENTION

According to one aspect of the invention there is provided a portable radio telephone for communication with base stations in a digital cellular radio telephone system employing transmission by a plurality of carrier frequencies in frames each consisting of a predetermined number of time slots, wherein the portable radio telephone comprises processing means operative to select for the radio telephone a communication channel, that is a combination of carrier frequency and time slot, by excluding any channel in a time slot where a channel selection attempt at a base station has failed.

It will be appreciated that the exclusion of a time slot will be temporary and that a particular slot will be "unblinded" by subsequent events. Preferably, the exclusion of a slot prevails for a number of unsuccessful channel selection attempts.

Preferably, on call handover from a current channel to a new channel the processing means additionally exclude any channel in the three adjacent time slots centered on the current channel.

The portable radio telephone may comprise storage means for storing a blind slot mask representative of the slots in each frame which are excluded, the remaining slots being available for selection of a channel.

Once channel selection has been unsuccessfully attempted in each of the remaining slots, the blind slot mask can be reversed so that those slots that have not previously been tried are rendered available for possible selection of a channel.

The processing means may be operative to check the slots for availability in a predetermined sequence which may correspond to the temporal sequence of the slots or to the reverse of the temporal sequence of the slots, until an available slot is found and a channel therein is selected.

In the preferred embodiment to be described, slots are checked for availability in sequence, starting from the first slot in the frame allocated for handset transmission and progressing to the final slot, before returning to the first slot.

According to another aspect the invention provides a method of communicating between a portable radio telephone and base stations in a digital cellular radio telephone system employing transmission by carrier frequencies in frames each consisting of a predetermined number of time slots, comprising selecting for the radio telephone a communication channel, that is a combination of carrier frequency and time slot, by excluding any channel in a time slot where a channel selection attempt at a base station has failed.

According to a yet further aspect there is provided a portable radio telephone for communication with base stations in a digital cellular radio telephone system employing transmission by a plurality of carrier frequencies in frames each consisting of a predetermined number of time slots, wherein the portable radio telephone comprises processing means operative to select for the radio telephone a communication channel, that is a combination of carrier frequency and time slot, such that successive attempts at channel selection are made in respective ones of the predetermined number of time slots.

BRIEF DESCRIPTION OF THE DRAWINGS

A portion of a digital cellular radio telephone system consisting of two base stations and a portable radio telephone (in the form of a handset) according to the invention will now be described, by way of example, with reference to the accompanying drawings, in which.

DETAILED DESCRIPTION OF THE INVENTION

Figure 1:
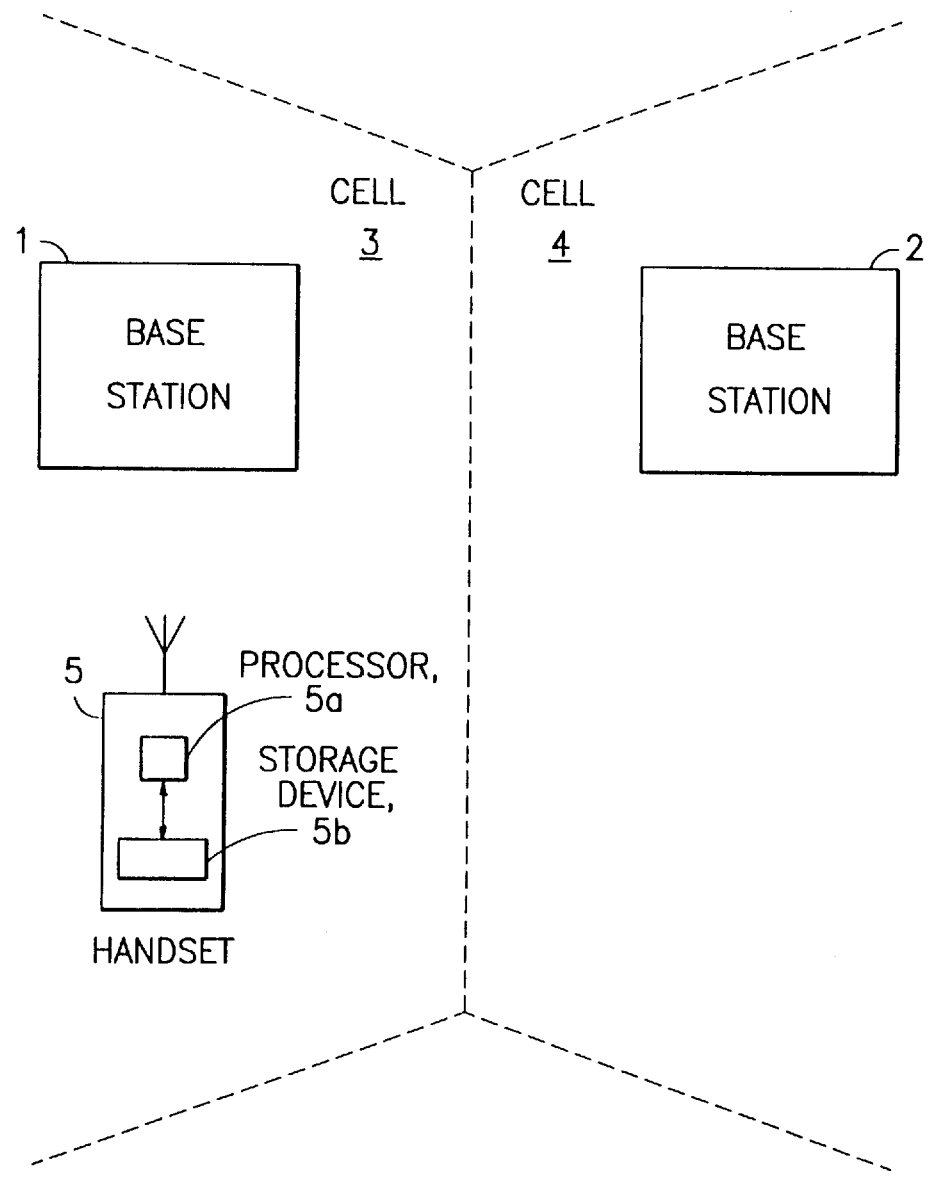
FIG. 1 is a diagram of the radio telephone system.

Referring to FIG. 1, the portion of the radio system depicted comprises two fixed base stations 1 and 2 serving respective cells 3 and 4 representing geographical areas of coverage which may be inside or outside buildings. A user or subscriber to the system carries a portable handset 5 which is capable of two-way radio communication with one or other of the base stations 1, 2, and with other base stations (not shown).

In the described example shown in the drawings, the radio telephone system conforms to the DECT (Digital European Cordless Telecommunications) standard and uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset.

The handset 5 has processing means programmed with an algorithm which is operative to select for the handset a communication channel, i.e. a combination of carrier frequency and time slot, taking into account the quietness of each channel, i.e. the degree of signal interference in that channel. To achieve this, the numbered signal strength of all channels is monitored at regular time intervals and the measured signal strengths are stored in the handset in a channel list, an example of which is shown in FIG. 3 in which the time axis extends horizontally and the frequency axis extends vertically.

Figures 3, 4:
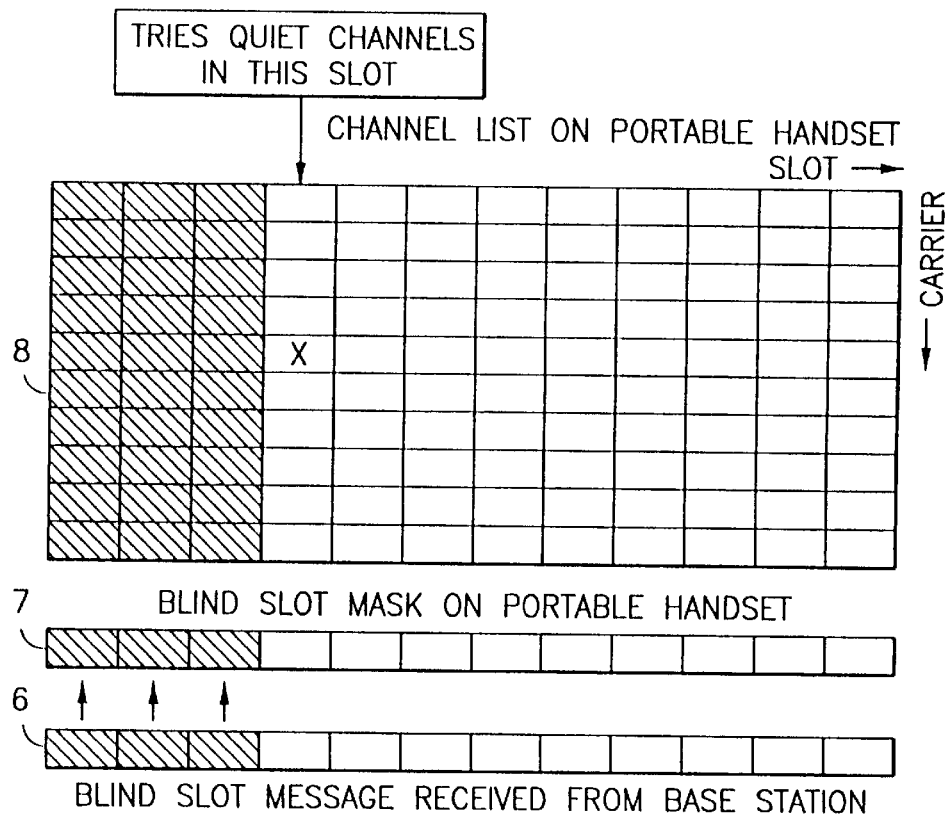
FIG. 3 is a diagram showing an exemplary channel list stored in the handset.
FIG. 4 is a diagram showing a channel list and an associated blind slot mask of the handset and a blind slot message from a base station, on call set-up.

Referring to FIG. 3, the twelve slots 1–12 of a representative frame are shown as columns, with the ten carrier frequencies being represented by horizontal rows. Hence, the array of FIG. 3 has 120 boxes, each representing a particular channel, i.e. a particular combination of time slot and carrier frequency. Signal strength is allocated a level from 0 to 12 (typically 6 dB bands are used), with 0 being the quietest (i.e. least interference) and 12 being the least quiet (i.e. most interference). Representative quietness levels for each channel are shown in FIG. 3 and the channels that do not satisfy the quietness requirement are shown shaded. FIG. 3 also shows the base station scan. The base station scans one carrier every time frame and works through all ten carriers in ten frames.

The algorithm fulfills three theoretical principles that all improve the probability of the portable handset assigning itself an available channel. These are:

1. Once a quiet channel has been attempted on a particular base station it can be assumed that this slot is blind, and no other channel on this slot should be attempted until all other slots have been tried first.
2. Once all the timeslots on the strongest base station have been attempted it can be assumed that it is full to capacity, and the same procedure can be applied to the next strongest base station.
3. Channels that fulfill the quality criteria for use (in DECT the least interfered channels are assumed to fulfill this criterion) should then be sorted for assignment in slot order. Then if all handsets use the same ordering for channels, slots will be blinded at approximately the same rate on all base stations if roughly even numbers of calls exist in each cell. This would have the effect of matching blind slot messages from all the base stations in the system.

Using the quietness bands to specify signal strength, the quality criteria for channel assignment is as follows:

1. The quietest available channel
2. If this quietest channel cannot be attempted within the next three frames (i.e. it is within three carriers of the current primary scan of the base station) a channel that can be attempted within three frames can be selected if it is within 2 bands of the quietest, otherwise the quietest is selected.

FIG. 4 shows at 6 the blind slot message received by the handset 5 from the base station 1 on call set-up. This indicates that the first three time slots are blind. Since the handset 5 imposes no blind slots, the blind slot mask 7 on the handset corresponds to the blind slot message 6 from the base station. Hence, the first three time slots in the channel list 8 stored in the handset are blind. The algorithm is operative to check availability of time slots in a sequence which proceeds from the first time slot allocated for base station transmission to the last time slot allocated for base station transmission, before returning to the first slot. Hence, quiet channels are checked for availability progressing from left to right in the channel list 8 in FIG. 4, so that there is a tendency for channels to be filled in an orderly sequence which, if all handsets operate the same system, will promote efficient channel allocation at the base stations. This check could be in reverse order, and could commence with any time slot.

The algorithm attempts set-up in a channel at "X" in the immediate slot after the blind slots in the mask, if one of these channels is one of the quietest. Since the blind slot information on the portable is correct, set-up succeeds.

Figure 5:
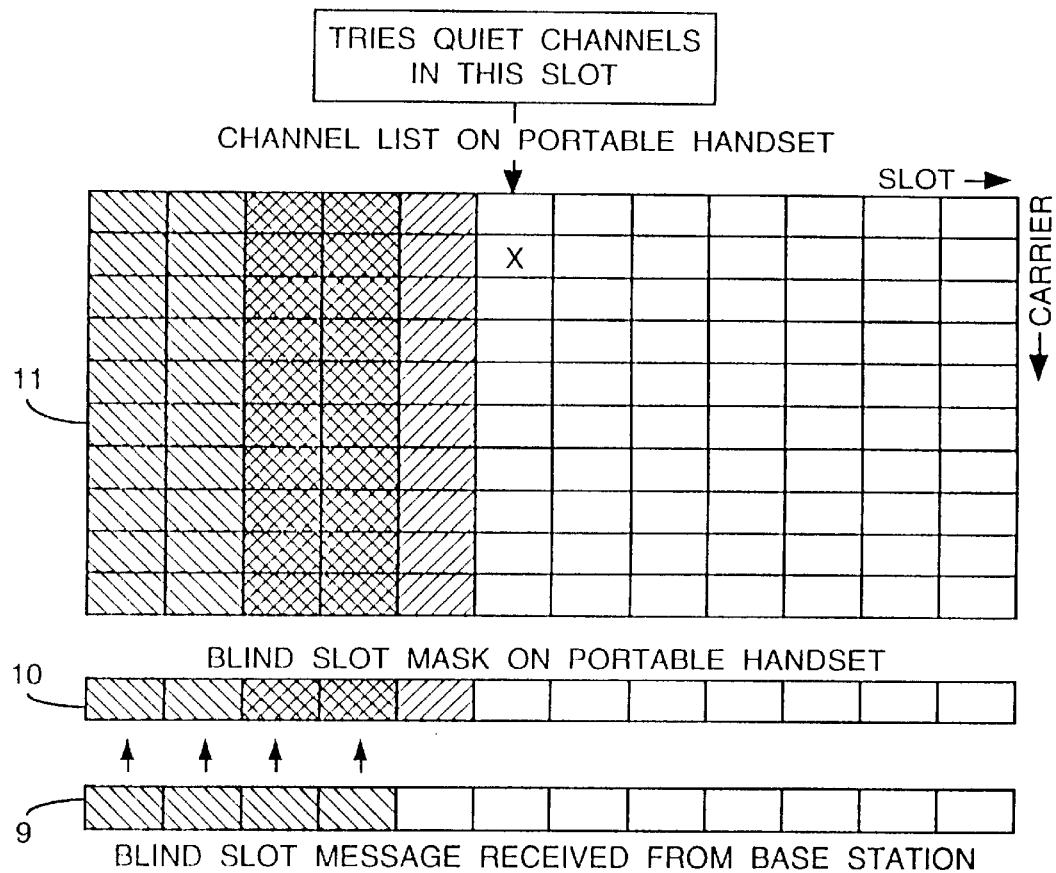
FIG. 5 is a diagram corresponding to that of FIG. 4 but for intracell handover.

Next, referring to FIG. 5, it is assumed that an intracell handover is required because the current channel degrades in quality. In this case the blind slot message 9 from the base station indicates that the first three slots remain blinded, together with the fourth slot because this is occupied by the transmission of the handset 5. The channel currently occupied by the handset, together with a channel either side thereof, is blinded by the handset, so the blind slot mask on the handset is a shown at 10, the resulting channel list being shown at 11.

This time the channel assigned, channel X, is slightly out of slot order on the base station. However, this vacant slot will soon be filled by another handset, due to the channel assignment procedure being in slot order. This type of algorithm (if used on every handset in the system) will tend to have the effect of assigning adjacent slots at the base station. This also decreases the chance of blind slots at the handset not actually being blind at the base station.

Figure 6:
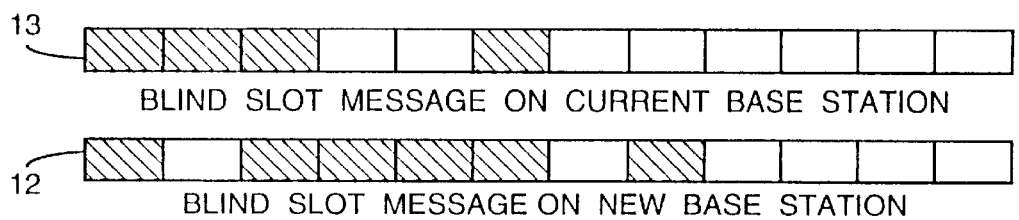
FIG. 6 shows a blind slot message on a current base station and a blind slot message on a new base station, to explain intercell handover.

Next, referring to FIG. 6, it is assumed that intercell handover is required, and that the blind slot message 12 at the new base station 2 is different from the blind slot message 13 at the current base station 1. This might not be the case if the proposed algorithm is used on every portable terminal in the system.

Figure 7:
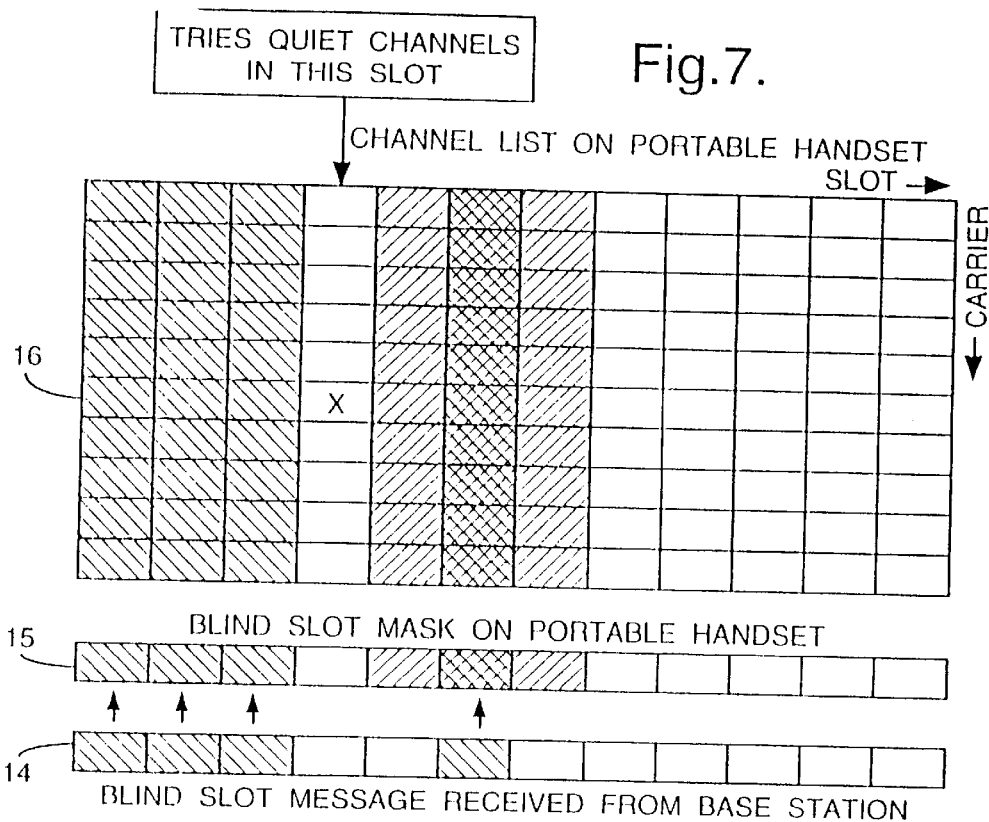
FIGS. 7 to 9 are diagrams corresponding to that of FIG. 4 but for attempted (FIGS. 7 and 8) and successful (FIG. 9) intercell handover.

On the handset, the current transmission channel and the two immediately adjacent channels are blinded so, referring to FIG. 7, the blind slot message from the currently connected base station 1 is shown at 14 and the blind slot mask on the handset at 15, the resulting channel list on the handset being as illustrated at 16. The handset tries channels in the fourth time slot but as this is blinded at the new base station (as shown by the blind slot message 12) channel assignment fails.

Figure 8:
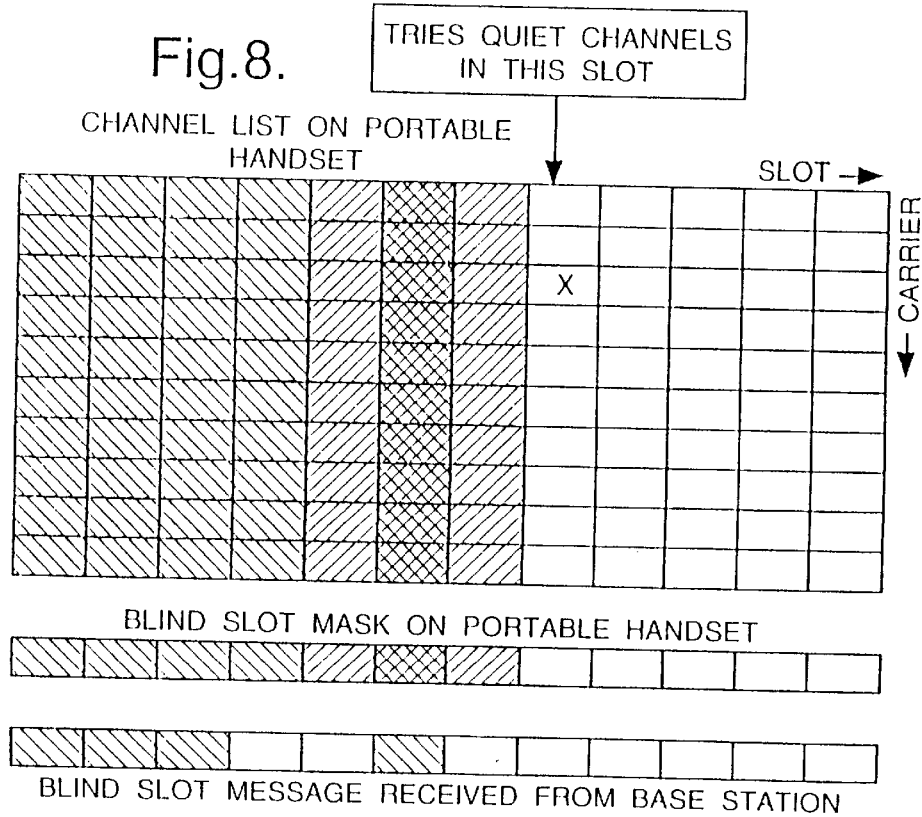
Figure 9:
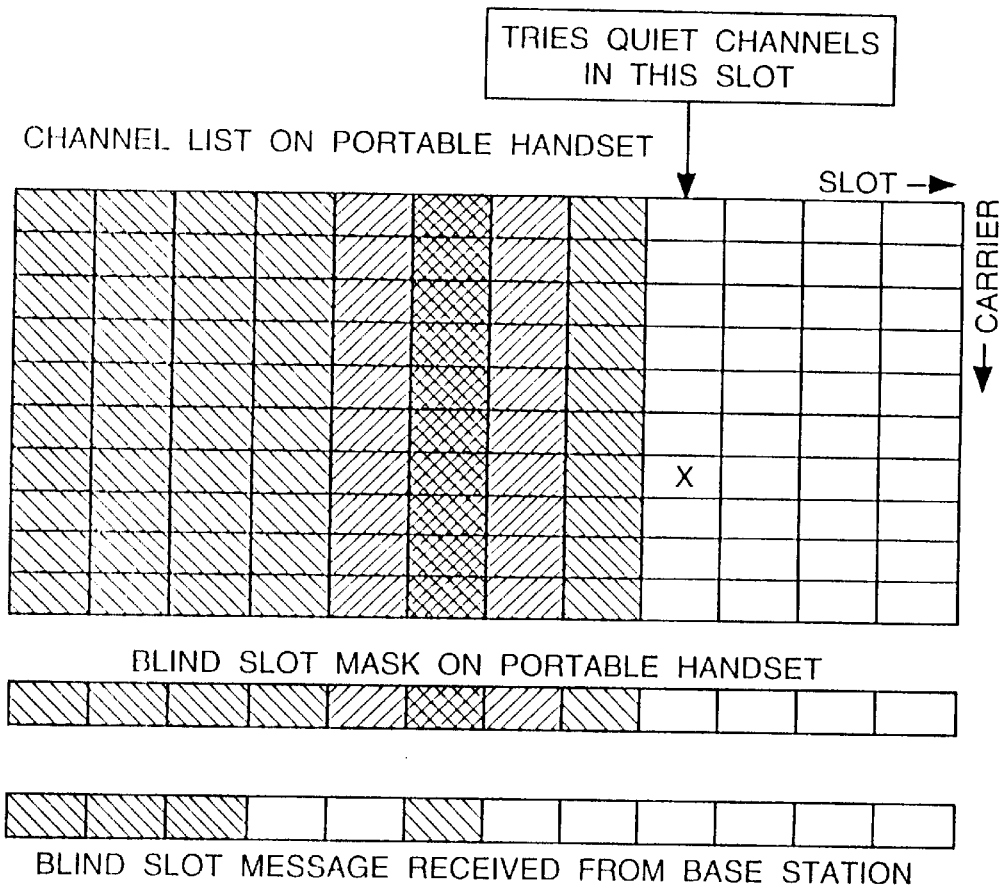

Once the handset fails assignment in a channel, it then marks this slot as blind and tries channels in the next slot. As shown in FIG. 8, the handset fails in this slot (the eighth) also, marks it as blind and tries the next slot (the ninth), as shown in FIG. 9. This time, channel assignment is successful and handover occurs.

Figure 10:
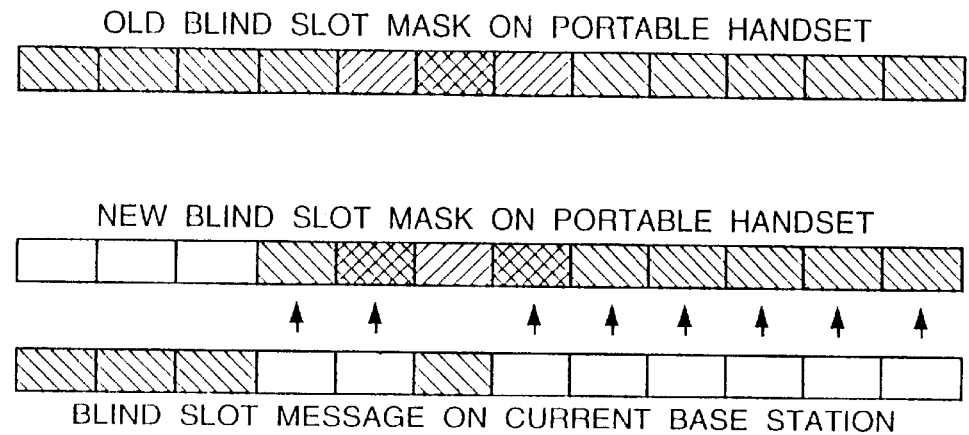
FIG. 10 is a diagram illustrating how the algorithm generates an inverse blind slot mask after all time slots in the mask are marked blind.

To ensure all possible slots are attempted at least once, the following procedure is used. Once all the slots in the blind slot mask have been marked blind, an inverse of the blind slot message is used to reset the blind slot mask, and the process continues as before. This is shown in FIG. 10.

This ensures that if an available slot exists on the base station (and it is not one of those thought to be blind by the handset) that it will be found. Once all the available slots at a single base station have been attempted, then an alternative base station can be tried. In general the number of attempts necessary to try all the available slots is the number of time slots in a frame less the number of slots blinded by the handset itself. In this particular case the number of attempts necessary is nine. To avoid additional unnecessary attempts at set-up or handover, reducing the efficiency of the set-up or handover process, it is desirable to make the number of attempts before handover/setup is discontinued for a specified period of, say, two to three seconds correspond to the number of attempts necessary to try all the available time slots.

The first base station tried is usually the strongest, and the second tried will be the second strongest. Once a new base station is decided upon, the blind slot mask is reset and the procedure starts again. The important features of the algorithm are:

1. The slot ordering of channels that meet a defined quality criteria for channel assignment, particularly on every handset in the system. This has two beneficial effects:

Blind slots on the base stations are more likely to be the same, thus improving the probability that portable handsets using the current base station blind slot information can perform intercell handover to an available slot at other base stations.

Channels will be used at base stations that are generally immediately adjacent to each other, thus the likelihood of handsets (that have blind slots adjacent to the one in use) missing available slots at the base station is reduced.

2. The marking of the entire slot as blind (in addition to those already blind) once assignment has failed at a single channel in this time slot.

3. When using (2), the limiting of channel assignment attempts at a single base station to the maximum number of available slots minus the number of blind slots at the handset.

4. Using (3) to detect a "busy" base station and then starting the channel assignment procedure anew with a different base station.

Figure 2:
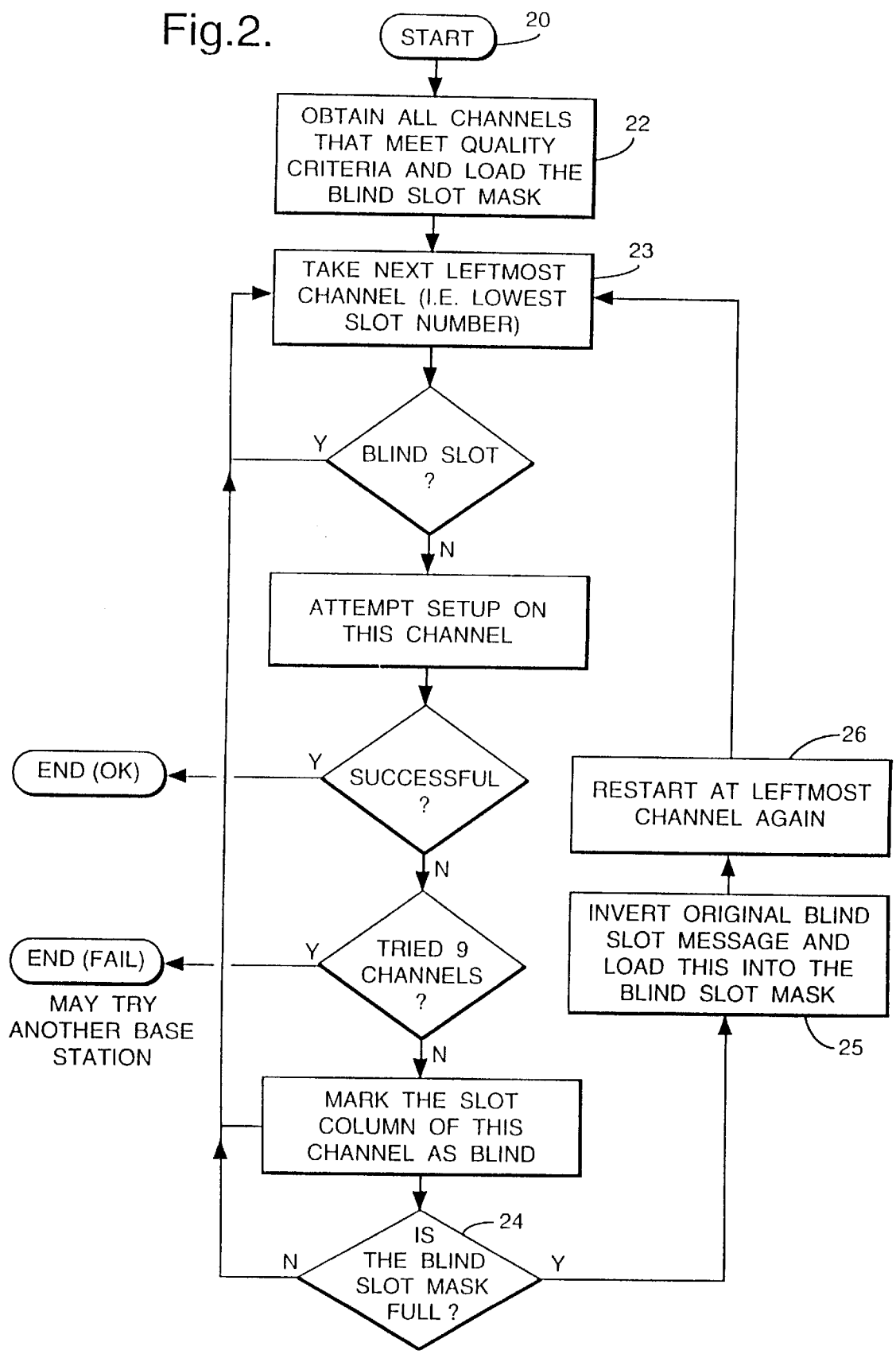
FIG. 2 is a flow chart representing the logic steps followed by an algorithm in the handset on call set-up.

FIG. 2 shows the steps followed by the algorithm in call set-up. Commencing at start, box 20, the next step, box 22, is to measure signal strengths, accept the blind slot message from a base station (if available) and load into the storage means in the handset the blind slot mask. Channel selection (box 23) then proceeds from the first time slot. If an available time slot is found, channel set-up is attempted until all nine channels are attempted, after which set-up with an alternative base station is attempted. Each time set-up in a channel fails, the time slot containing that particular channel is marked blind. If the blind slot mask is full (decision block 24), the original blind slot message is inverted (box 25) and the process repeated (box 26).

what is claimed is:

1. A portable radio telephone for communication with base stations in a digital cellular radio telephone system employing transmission by a plurality of carrier frequencies in frames each consisting of a predetermined number of time slots, wherein the portable radio telephone comprises processing means operative to select for the radio telephone a communication channel, that is a combination of a carrier frequency and a time slot, by excluding from selection any communication channel associated with a time slot where an attempt at communication to a base station during the associated time slot has failed, wherein the portable radio telephone comprises storage means for storing a blind slot mask representative of the time slots in each frame which are excluded, the remaining time slots being available for the communication attempt, and wherein if all the time slots in the blind slot mask are excluded the processing means constructs a new blind slot mask in which those excluded time slots are rendered available for possible selection of a channel.

2. A portable radio telephone according to claim 1, wherein the exclusion of a time slot remains in effect at least until a number of unsuccessful attempts at communication exhausts a set of non-excluded communication channels.

3. A portable radio telephone according to claim 1, wherein on call handover from a current channel to a new channel the processing means additionally excludes any channel in three adjacent time slots centered on the current channel.

4. A portable radio telephone according to claim 1, wherein the storage means additionally stores information expressive of signal strengths of at least certain channels and wherein the processing means selects a channel in an available time slot by reference to the stored information that is expressive of signal strength in that channel.

5. A portable radio telephone according to claim 4, wherein the signal strengths are representative of interference and must not exceed a predetermined threshold for channel selection to occur.

6. A portable radio telephone according to claim 5, wherein the predetermined threshold is 0, 1 or 2 in a range of zero to twelve, where zero represents the least interference and twelve represents the most interference.

7. A portable radio telephone according to claim 1, wherein the processing means is operative to check the time slots for availability in a predetermined sequence which corresponds to the temporal sequence of the time slots or to the reverse of the temporal sequence of the time slots, until an available time slot is found and a channel therein is selected.

8. A portable radio telephone according to claim 7 and forming one of a plurality of such radio telephones each of which checks time slots according to the same predetermined sequence, to promote orderly filling of the time slots at all base stations.

9. A portable radio telephone according to claim 1 wherein there are 10 carrier frequencies separated from one another by about 1.728 MHz within a frequency band from about 1800 MHz to about 1900 MHz, wherein each frame has a duration of about 10 milliseconds and is divided into 24 time slots.

10. A method of communicating between a portable radio telephone and a base station in a digital cellular radio telephone system, the method comprising the portable radio telephone executed steps of:

(A) storing a communication channel list in the portable radio telephone, the communication channel list being logically ordered as a plurality of rows and a plurality of columns, wherein each row represents one of a plurality of carrier frequencies, and each column represents one of a predetermined number of time slots such that each intersection of a row and a column represents one of a plurality of communication channels;

(B) making received signal strength measurements for individual ones of the communication channels;

(C) receiving a time slot availability message from the base station, the time slot availability message containing information specifying communication channel usage;

(D) storing information in the communication channel list based on the results of the signal strength measurements and the received time slot availability message;

(E) selecting a communication channel from the communication channel list;

(F) verifying that the selected communication channel is within an available time slot that has not been previously excluded based at least on a failed attempt to establish communication with the base station;

(G) wherein if the selected communication channel is within an available time slot, attempting to establish communication on the selected communication channel between the portable radio telephone and the base station;

(H) wherein if the attempted communication is unsuccessful, marking all communication channels within the same column as the selected communication channel as unavailable, thereby excluding the marked communication channels; and (I) selecting a next communication channel of the communication channel list, verifying the selected communication channel is within an available time slot, and attempting to establish communication on the selected communication channel until all time slots are marked as unavailable or a successful communication channel is established.

11. A method of communicating between a portable radio telephone and a base station in a digital cellular radio telephone system as in claim 10, further comprising the steps of:

wherein when all columns contain communication channels are marked as unavailable, inverting the information in the time slot availability message previously received from the base station;

replacing the information stored in the communication channel list with the inverted information based on the information in the time slot availability message; and re-executing steps (E)–(I).

12. A method of communicating between a portable radio telephone and a base station in a digital cellular radio telephone system as in claim 11, wherein when all time slots of a first base station are marked as unavailable and a successful communication channel is not established between the portable radio telephone and the first base station, communication between a next base station in the digital cellular radio telephone system and the portable radio telephone is attempted by re-executing steps (B)–(I).

13. A method of communicating between a portable radio telephone and a base station in a digital cellular radio telephone system as in claim 10, wherein the step of making received signal strength measurements in individual ones of said communication channels further comprises the step of:

assigning a value from a predetermined set of values which represents an amount of signal strength of the communication channel;

wherein a predetermined signal strength value satisfies a quality criteria for use.

14. A method of communicating between a portable radio telephone and a base station in a digital cellular radio telephone system as in claim 13, wherein each value of the predetermined set of values is a predetermined amount of decibels from a next value of the predetermined set of values.

15. A method of communicating between a portable radio telephone and a base station in a digital cellular radio telephone system as in claim 14, wherein the predetermined amount of decibels is 6 decibels.

* * * * *